United States Patent
van den Heuvel et al.

[15] 3,665,225
[45] May 23, 1972

[54] HYBRID SURFACE-WAVE TRANSDUCER

[72] Inventors: Anthony P. van den Heuvel, Homewood; Ronald B. Owen, Chicago, both of Ill.; Shrinivas G. Joshi, Bangalore, India

[73] Assignee: IIT Research Institute, Chicago, Ill.

[22] Filed: Aug. 28, 1970

[21] Appl. No.: 67,766

[52] U.S. Cl. ............................... 310/8.1, 310/8.2, 310/9.7, 333/30
[51] Int. Cl. .......................................... H01v 7/00
[58] Field of Search ................ 310/9.2, 9.7, 8.2, 8.3, 8.7, 310/9.1, 8.1, 9.8; 332/30, 72

[56] References Cited

UNITED STATES PATENTS

| | | | |
|---|---|---|---|
| 3,515,911 | 6/1970 | Byram et al. | 310/9.8 X |
| 3,360,749 | 12/1967 | Sittig | 310/8 X |
| 2,439,130 | 4/1948 | Firestone | 333/30 X |
| 3,550,045 | 12/1970 | Adler | 333/30 |
| 3,401,360 | 9/1968 | Du Bois | 310/9.8 X |
| 1,990,822 | 2/1935 | Goldstine | 310/9.7 X |
| 2,785,322 | 3/1957 | Wood | 310/9.7 |

FOREIGN PATENTS OR APPLICATIONS

| | | | |
|---|---|---|---|
| 762,874 | 7/1952 | Germany | 310/9.7 |

*Primary Examiner*—J. D. Miller
*Assistant Examiner*—B. A. Reynolds
*Attorney*—Fitch, Even, Tabin & Luedeka

[57] ABSTRACT

A transducer for generating and detecting surface elastic waves in a non-piezoelectric material may include an interdigital electrode array coupled to a piezoelectric crystal. The crystal is mechanically coupled to the non-piezoelectric material through an acoustical transmissive medium.

18 Claims, 2 Drawing Figures

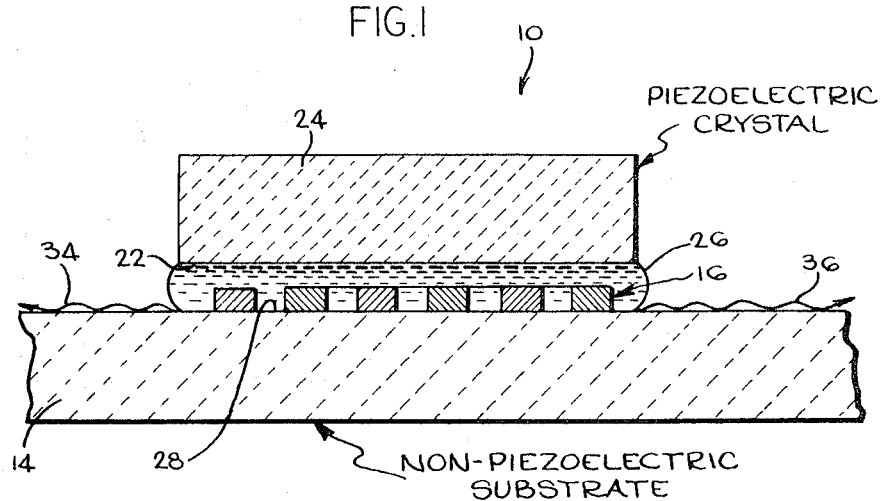
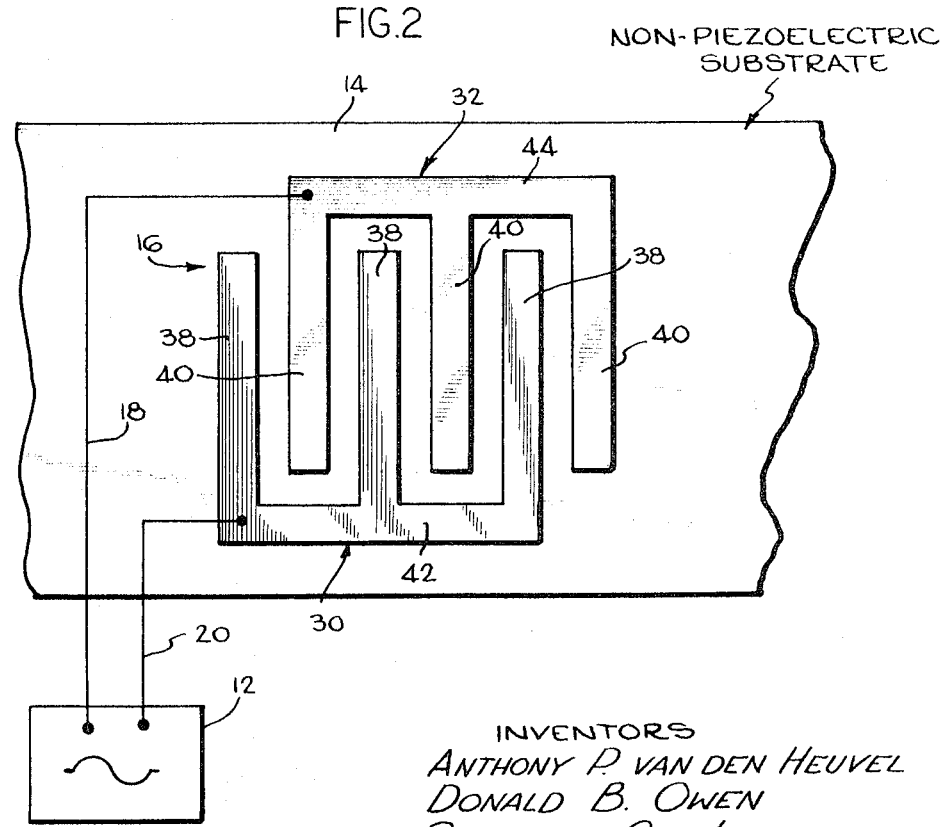
INVENTORS
ANTHONY P. VAN DEN HEUVEL
DONALD B. OWEN
SHRINIVAS G. JOSHI

HYBRID SURFACE-WAVE TRANSDUCER

The present invention relates to devices for transducing signals between an electrical mode in an electric circuit and a mechanical or elastic surface-wave mode on a non-piezoelectric material, and more particularly, to acoustic surface-wave transducers for the generation and detection of Rayleigh waves on non-piezoelectric or passive substrates.

Although the generation and detection of elastic surface-waves, Rayleigh waves in particular, may be readily accomplished on piezoelectric substrates by means of the now well established interdigital or single phase grating transducer structures, there are many non-piezoelectric materials which are known to have, or which may have, desirable acoustic properties for which no transducing means comparable in efficiency or simplicity is believed known.

For the generation of an elastic surface-wave on a substrate, it is generally necessary to provide a spatially periodic mechanical disturbance on the surface of the proposed propagation medium. Heretofore, various means for achieving this on non-piezoelectric or similar media have been proposed, but each has been found to suffer from one or more problems, such as difficulty of fabrication, inflexibility, or poor efficiency. Examples of such prior transducing means include the mechanical comb and the mode conversion wedge (see, for example, Rayleigh and Lamb Waves, I. A. Viktorov, Plenum Press, New York, 1967) or mode conversion from a bulk wave by means of periodic scatterers (see, for example, Humphryes and Ash, Electronics Letters, Volume 5, 1969, page 175, or H. L. Bertoni, G–MTT Special Issue of the Institute of Electrical and Electronic Engineers on Microwave Acoustics, 1969).

Accordingly, it is an object of the present invention to provide a surface-wave transducer for non-piezoelectric materials which has an efficiency somewhat comparable to an interdigital transducer on a good piezoelectric surface.

It is a further object of the present invention to provide such an improved surface-wave transducer which is as simple in construction or fabrication as the conventional interdigital transducer, while being vastly superior in performance to the various techniques heretofore known for the purpose.

These and other objects of the invention are specifically set forth in the following detailed description, and in the accompanying drawings, wherein:

FIG. 1 is a section view illustrating the structure of a surface-wave transducer on a portion of a non-piezoelectric substrate in accordance with an embodiment of the present invention; and FIG. 2 is a plan view of the structure illustrated in FIG. 1 having certain portions removed for the sake of clarity, and showing an electrical circuit in schematic block form.

Referring now to FIGS. 1 and 2, there is generally illustrated a device 10 for transducing signals between an electric circuit, illustrated schematically as the input r.f. (or other a.c.) signal source 12, and a mechanical or elastic surface-wave mode on a non-piezoelectric or passive substrate 14. The transducer 10 comprises an interdigital electrode array 16 which is adapted for connection to the opposite polarity terminals of the circuit 12, via suitable terminals and leads 18 and 20, and which is electrically or electromagnetically coupled through a fringing field to a surface 22 of piezoelectric crystal 24. The transducer 10 further comprises means, illustrated as an acoustical transmissive medium 26, for mechanically coupling the surface 22 of the piezoelectric crystal 24 to a surface 28 of the non-piezoelectric substrate 14. The acoustical transmissive medium 26 is preferably in the liquid state and physically disposed between at least a portion of the surface 22 of the piezoelectric crystal 24 and at least a portion of the surface 28 of the non-piezoelectric substrate 14, both of which surface portions are mutually parallel in the illustrated embodiment.

The interdigital electrode 16 on the non-piezoelectric substrate 14 as shown in FIG. 2 with the piezoelectric crystal 24 and the acoustical transmissive medium 26 removed for the sake of clarity of illustration. The interdigital electrode array 16 is of conventional type comprising a pair of metallic comb structures, 30 and 32 respectively, having an array of conductive fingers or projection lines extending from the respective electrodes and interdigitated in opposed relation to define a grating. The conductive projection lines of both comb structures in the illustrated construction are disposed on the surface of the non-piezoelectric substrate normal to the directions of wave propagation. The generated Rayleigh surface-waves are symbolically shown in FIG. 1 by lines 34 and 36 travelling in opposite directions along the surface 28 of the passive substrate 14.

More particularly, the comb arrays 30 and 32 form an interdigital array of three finger pairs of spaced apart, elongated coplanar elements 38 and 40 electrically joined to each respective comb electrode. The electrode 16 may be formed by plating a uniform layer of conductive material, such as aluminum, gold or other metal, on the upper planar surface 28 of the passive substrate 14. Portions of the metal are then etched away by using standard and well known photo-resist and thin-film techniques to leave the desired projecting conductive strips 38 and 40 electrically joined together in an integral fashion by respective side rails or strips 42 and 44 associated with the respective comb structures 30 and 32. The successively alternate strips 38 and 40 form acoustically separate electrode pairs, and although three such pairs are shown in the illustrated embodiment, this is, of course, merely exemplary and the particular number of pairs will depend on design considerations well known to the art.

The crystal 24 may be formed of any suitable ultrasonic surface-wave supporting or propagating material having piezoelectric properties, such as, for example, suitably cut quartz crystal, cadmium sulfide, lithium niobate, PZT (tradename for a piezoelectric lead zirconate titanate composition of Clevite Corporation), barium titanate, etc. The piezoelectric crystal 24 preferably has a thickness of only a few millimeters and is placed directly onto the acoustical transmissive medium 26. When, as in the preferred embodiment, the medium 26 is a liquid, the piezoelectric crystal 24 is supported merely by the surface tension of the liquid. This provides a spacing between the lower surface 22 of the piezoelectric crystal and the upper surface of the grating 16 of only a few micrometers (microns) or less. The total distance between the respective opposing surfaces of the crystal 24 and the substrate 14 is in the order of micrometers and preferably smaller.

Various liquids may be employed as the mechanical coupling between the two surfaces, and it is believed that generally any liquid will operate satisfactorily. For example, ethyl alcohol, trichloroethylene, water, acetone and mineral oil have been tried and found about equal in performance. However, the volatile liquids are advantageous in the sense that the excess can be readily removed, while excess oil, for example, may typically cause some damping of the wave beyond the transducer. Phenyl benzoate has been found to also perform well while in its liquid state, but causes a drop of several decibels in the transducer output upon solidification. Thus, it has been found that generally a liquid coupling is preferred, although a solid acoustical transmissive medium may be satisfactory in some applications. Other solid materials having electrical insulating and acoustical transmissive properties may, of course, be employed.

Since the transducer structures in accordance with the illustrated embodiment of the present invention include an "active" chip of material, viz., the piezoelectric crystal 24, on a selected region or regions of a "passive" substrate, viz., the non-piezoelectric substrate 14, they may be termed "hybrid transducers" by analogy with hybrid integrated circuit technology using a silicon chip containing active components on an inert substrate containing passive components.

In certain specific hybrid transducer constructions in accordance with the principles of the invention, sets of interdigital electrodes having eight finger pairs were respectively deposited on Pyrex (glass), fused silica and sapphire substrates, corresponding to the non-piezoelectric substrate 14 of FIGS. 1 and 2. Spacings between fingers of each interdigital electrode set were 0.005, 0.0025 and 0.00125 inches, which correspond respectively to frequencies of approximately 6 MHz, 12 MHz and 24 MHz when crystalline quartz is the piezoelectric substrate. Small pieces of $yx$ quartz, $yz$ lithium niobate and PZT were placed over the respective electrode structures. Mechanical coupling between the two surfaces was provided by a liquid acoustical transmissive medium as indicated above, and all operated satisfactorily.

Delay lines were also constructed using different combinations of non-piezoelectric propagation media and piezoelectric blocks or chips, and the measured characteristics are shown in the table below.

TABLE OF PARAMETERS FOR VARIOUS COMBINATIONS OF MATERIALS

| | Piezoelectric material | | | | | | | | | | | |
|---|---|---|---|---|---|---|---|---|---|---|---|---|
| | Quartz | | | | LiNbO$_3$ | | | | PZT | | | |
| Substrate material | $f_0$ (MHz) | $\Delta f/f_0$ (percent) | $\alpha$ (db) | Ra (ohms) | $f_0$ (MHz) | $\Delta f/f_0$ (percent) | $\alpha$ (db) | Ra (ohms) | $f_0$ (MHz) | $\Delta f/f_0$ (percent) | A (db) | Ra (ohms) |
| Pyrex | 6.25 | 2 | 30 | 900 | 6.5 | 11 | 21 | 600 | 6.3 | 9.5 | 50 | 1,500 |
| Fused silica | 6.5 | 2 | 35 | 800 | 6.8 | 12 | 18.5 | 600 | 6.2 | 9.5 | 40 | 1,500 |

Lithium niobate on sapphire; $f_0$=7.2 and CdS on Pyrex; $f_0$=6.7 for 5 mil wide 5 mil space combs.

Referring to the table, $f_o$ is the resonant frequency, $\Delta f/f_o$ is the fractional band width; $\alpha$ is the insertion loss; and Ra is the radiation resistance. As can be seen from the table, the performance of fused silica and pyrex using the hybrid transducers in accordance with the invention at 6 MHz are essentially identical. Optimum performance was achieved with lithium niobate crystals as the piezoelectric element in the transducers, and a total insertion loss as low as 14 db was obtained at 27 MHz using these composite transducers on fused silica. The measured band width for this particular delay line of 12 percent is believed due to the number of fingers in the electrode structure, and that 24 percent should be obtained with lithium niobate with no increase in insertion loss when fewer fingers are employed.

Generation of surface-waves was also obtained with cadmium sulfide chips on pyrex, despite the large difference in surface-wave velocity for the two materials. It is desirable that the distance or length of mechanical coupling along the respective opposing surfaces of the piezoelectric crystal and the non-piezoelectric substrate be made very small (i.e., a few wavelengths, such as about 10 or less) to achieve the generation of surface-waves on sapphire, silicon and Lucalox (proprietary name for a dense alumina ceramic material of the General Electric Company).

The hybrid transducers in accordance with the principles of the invention will operate at the third and fifth harmonics, and good performance has been achieved up to 70 MHz fundamental frequency using lithium niobate on fused silica.

The distance or spacing between the grating electrode lines 38 and 40, as well as their various dimensions, depend on the signal frequencies to be used and on the particular nature of the materials with which the transducer of the invention is to be employed. These parameters may be readily determined in the known manners applicable to conventional interdigital transducer devices typically employed with piezoelectric crystals, and the well known design techniques normally used in connection therewith.

While in the illustrated embodiment the piezoelectric crystal 24 is merely placed on the thin liquid film 26, any suitable means may be provided to contain the liquid and to prevent evaporation, if desired. For example, one or more insulated spacers may be provided to support the piezoelectric crystal 24, and the spacer may be in the form of a carriage resting on the upper surface of the passive substrate 14 but bridging or straddling the grating electrode region thereon. The liquid acoustical transmissive medium 26 may be contained by a suitable retainer on the insulated spacer or by a suitable housing structure enclosing the entire transducer assembly or device with which it may be used.

Where the acoustical transmissive medium 26 is a solid, this, itself, may of course be employed to support the piezoelectric crystal 24.

For practical convenience of construction, the interdigital electrode structure 16 is preferably deposited on the non-piezoelectric substrate 14. But other arrangements may alternatively be employed so long as the electrodes are placed in sufficiently close proximity to (or directly on) the piezoelectric crystal so that a spatially periodic fringing electric field is coupled therebetween. Thus, the interdigital electrode grating may be disposed in a plane at any distance between the piezoelectric crystal surface 22 and the non-piezoelectric substrate surface 28, limited, however, by the maximum mechanical coupling distance which can be tolerated through the acoustical transmissive medium 26. Also, the area of mechanical coupling between the piezoelectric crystal and the non-piezoelectric substrate need not be coextensive with the area of field coupling between the electrodes and the piezoelectric crystal. Thus, the piezoelectric 24 may, if desired, be extended to the left or right (as illustrated) of the electrode grating 16 and the transducer may employ the acoustical transmissive medium 26 between the respective piezoelectric and non-piezoelectric surfaces on the left or right of the electrode grating, so that the mechanical coupling between the piezoelectric and non-piezoelectric materials is offset to a completely different surface region or area from the electric field coupling to the piezoelectric crystal surface.

Additionally, although a conventional interdigital electrode array is illustrated in FIG. 2 for surface-wave propagation normal to the orientation of the electrode fingers, the finger elements may be curved in various manners to produce divergence and convergence of the propagated surface-waves.

Thus, a transducer to efficiently generate or detect surface elastic waves on a wide variety of non-piezoelectric substrates utilizing the hybrid principle of the present invention has been described. Such transducer devices are extremely small and readily fabricated using known thin-film techniques. Further, these hybrid transducers in accordance with the present invention have extensive application to the fields of materials evaluation, non-destructive testing, and microsound circuits on non-piezoelectric substrates, as well as in any area where ultrasonic electric-acoustic transduction to a non-piezoelectric or passive acoustic material is desired.

Together with the same ease of fabrication, these transducers are almost as efficient as the interdigital electrode transducers on good piezoelectric surfaces, and far more efficient than those prior transducers earlier discussed.

Although a specific embodiment in accordance with the present invention has been illustrated and described, various modifications will be apparent to those skilled in the art; accordingly, the scope of the invention should be defined only by the appended claims, and equivalents thereof.

Various features of the invention are set forth in the following claims.

What is claimed is:

1. A device for transducing signals between an electrical mode in an electric circuit and an elastic surface-wave mode in a non-piezoelectric material, comprising an interdigital electrode array adapted for connection to said circuit and being electrically coupled to one surface of a piezoelectric material for transduction of elastic surface-waves between said array and said surface of the piezoelectric material, and means for mechanically coupling at least a portion of said one surface of the piezoelectric material to at least a portion of a surface of said non-piezoelectric material.

2. The device of claim 1 wherein said mechanical coupling means comprises an acoustical transmissive medium physically disposed between said portion of said surface of said piezoelectric material and said portion of said surface of the non-piezoelectric material.

3. The device of claim 2 wherein said acoustical transmissive medium is in a liquid state.

4. The device of claim 3 wherein said liquid is selected from the group consisting of ethyl alcohol, trichloroethylene, water and acetone.

5. The device of claim 3 wherein said liquid is an oil.

6. The device of claim 2 wherein said acoustical transmissive medium is phenyl benzoate.

7. The device of claim 6 wherein the phenyl benzoate is in a liquid state.

8. The device of claim 1 wherein the respective surface portions of said piezoelectric and non-piezoelectric material are mutually parallel.

9. The device of claim 8 wherein said interdigital array defines a plane parallel to said respective surface portions.

10. The device of claim 1 wherein said interdigital electrode array is disposed on said surface of said non-piezoelectric material.

11. The device of claim 1 wherein said surface portions of the piezoelectric material and said non-piezoelectric material in the region of mechanical coupling therebetween are spaced no greater than a distance of 10 micrometers.

12. The device of claim 1 wherein said piezoelectric material is lithium niobate.

13. An ultrasonic surface-wave transducer for non-piezoelectric materials comprising a piezoelectric crystal, electrode means for coupling a spatially periodic fringing field to a surface of said piezoelectric crystal for transduction of elastic surface-waves on said surface of the piezoelectric crystal, and an acoustical transmissive medium physically disposed between at least a portion of said surface of the piezoelectric crystal and a surface of the non-piezoelectric material to provide a mechanical coupling therebetween.

14. The transducer of claim 13 wherein said acoustical transmissive medium is a liquid.

15. The transducer of claim 13 wherein said surface portion of the piezoelectric material is spaced from the non-piezoelectric surface by a distance of the order of micrometers.

16. A method of transducing signals between an electrical mode and an elastic surface-wave mode in a non-piezoelectric material, comprising the steps of coupling a spatially periodic fringing electric field to a surface of a piezoelectric crystal for transduction of elastic surface-waves on said surface of the crystal, and mechnically coupling at least a portion of said surface of the piezoelectric crystal to a surface of the non-piezoelectric material with an acoustical transmissive medium.

17. The method of claim 16 wherein the acoustical transmissive medium is a liquid.

18. The method of claim 16 wherein said surface portion of the piezoelectric crystal is spaced from the surface of the non-piezoelectric material a distance of the order of micrometers.

* * * * *